United States Patent
Curcio et al.

(10) Patent No.: US 9,471,993 B2
(45) Date of Patent: Oct. 18, 2016

(54) METHOD AND APPARATUS FOR SENSOR AIDED EXTRACTION OF SPATIO-TEMPORAL FEATURES

(71) Applicant: Nokia Technologies Oy, Espoo (FI)

(72) Inventors: Igor Danilo Diego Curcio, Tampere, FL (US); Sujeet Shyamsundar Mate, Tampere, FL (US); Francesco Cricri, Tampere, FL (US)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 14/155,936

(22) Filed: Jan. 15, 2014

(65) Prior Publication Data

US 2014/0212002 A1 Jul. 31, 2014

Related U.S. Application Data

(60) Provisional application No. 61/758,528, filed on Jan. 30, 2013.

(51) Int. Cl.
*G06T 7/20* (2006.01)
*H04N 5/232* (2006.01)
*G06K 9/00* (2006.01)

(52) U.S. Cl.
CPC ......... *G06T 7/2033* (2013.01); *G06K 9/00744* (2013.01); *H04N 5/23258* (2013.01); *G06T 2207/10016* (2013.01); *G06T 2207/30241* (2013.01)

(58) Field of Classification Search
CPC ..................... H04N 5/23251–5/23261; G06K 9/4671–9/4676; G06T 7/20–7/2093
See application file for complete search history.

(56) References Cited

U.S. PATENT DOCUMENTS

| | | | |
|---|---|---|---|
| 2003/0223618 A1* | 12/2003 | Cahill | G01S 17/89 382/107 |
| 2009/0002501 A1* | 1/2009 | Silsby | G11B 31/006 348/208.16 |
| 2012/0219188 A1* | 8/2012 | Kurz | G06K 9/3216 382/103 |
| 2013/0342714 A1* | 12/2013 | Zhou | H04N 5/23258 348/208.2 |

* cited by examiner

*Primary Examiner* — Paul Berardesca
(74) *Attorney, Agent, or Firm* — Alston & Bird LLP

(57) ABSTRACT

A method, apparatus and computer program product are provided for extracting spatio-temporal features with the aid of sensor information. An exemplary method comprises receiving video data and auxiliary sensor data and associating the two with timestamp information. The method may also include segmenting an input data stream into stable segments and extracting temporal features from the associated video data. The method may further include extracting temporal features either form the whole video or only from the video data where little or no stable segments are detected and performing camera view motion compensation by using information provided by the auxiliary sensors for modifying the feature-descriptors.

20 Claims, 8 Drawing Sheets

METHOD AND APPARATUS FOR SENSOR AIDED EXTRACTION OF SPATIO-TEMPORAL FEATURES

TECHNOLOGICAL FIELD

Embodiments of the present invention relate generally to media content and, more particularly, relate to a method, apparatus, and computer program product for extracting spatio-temporal features with the aid of sensor information.

BACKGROUND

Advances in technology have allowed cellular telephones, or smartphones, to include high-quality cameras, which allow recording at any moment in anyone's day. It has become increasingly popular to record video using cellular telephones at public events, such as concerts, theater performances and/or sporting events and then store the captured media content, such as an image, a video, an audio recording and/or the like. With the increased popularity of such behavior, the need for analysis of stored media content for purposes such as automatic organization of personal media collections, automatic summarization of individual videos, human-computer visual interaction, has also grown.

One of the first steps in analyzing videos consists of extracting features from the raw data. These features need to incorporate salient information about the video content in a compressed way. Many efforts have been made in designing features which extract the salient information from each frame of a video, such as color features, texture features, local interest points, etc. Moreover, features which specifically target videos (instead of simple images), i.e. incorporating the motion information, have also been developed, such as spatio-temporal interest points. Such temporal features have been shown to perform relatively well on standard datasets of videos captured by professional content producers (i.e. TV producers), in which camera motion is either rare/absent or well controlled by the cameramen. However, user generated videos (such as those recorded by common people using their camera-enabled mobile phones) are characterized by a lot of both intentional and unintentional camera motion, due to the uncontrolled settings and context in which the video recording happens. Temporal features extracted from such user generated videos are likely to perform very poorly because the motion of the content is confused with the motion of the camera. Methods which are able to cope with these problems are thus essential for the success of any analysis of motion in the content of mobile phone videos.

The present invention provides a method for overcoming the limitations of video temporal features which are corrupted by camera motion or by any other aspect which has the effect of changing the motion information of the real recorded objects or scene, such as zooming operations.

BRIEF SUMMARY

A method, apparatus and computer program product are therefore provided according to an example embodiment of the present invention for extracting spatio-temporal features with the aid of sensor information. The method, apparatus and computer program product according to an example embodiment may also be configured into two parts. In the first part, auxiliary sensor data, i.e. data output by motion sensors such as an accelerometer, a compass, or a gyroscope, is analyzed. During this step the input video may be segmented according to the amount of camera view motion. Camera view motion may be both the camera motion (e.g., panning, tilting, etc.) and the changes of a zoom level, because both camera motions, such as panning and tilting, as well as zooming may affect the information describing the real motion of the recorded objects or scene. In other words, device motion is detected and the input video is segmented accordingly. Then the video segments with no or low, with respect to a predefined threshold, camera view motion are selected for subsequent analysis, i.e. for the extraction of temporal features. The video segments with no or low camera view motion are referred to as "stable segments". In this way, the extracted temporal features will not be corrupted by camera view motion but, instead, they will incorporate only the real motion of objects. In a second part, when the amount of camera view motion is high for a large part of the video data, the temporal features extracted from the detected stable video segments may not be sufficient for the task at hand. Thus temporal features are detected from the whole video length (or from representative frames or segments of the video) and then the information provided by the auxiliary sensors is used for modifying the feature-descriptors so that they are made independent from camera view motion.

One example method may include receiving video data captured from a camera device, receiving sensor data captured from auxiliary sensors associated with the camera device, causing association of the sensor data and the video data using time data, wherein each of one or more samples of sensor data is associated with a single video frame, detecting camera view motion in the sensor data and causing segmentation of the sensor data into stable segments, extracting one or more temporal features from the video data associated with the stable segments of the sensor data. The method may further comprise performing orientation compensation on the one or more temporal features. In one embodiment, sensor data may be data output by motion sensors, sensor data may describe both camera motion and zoom, and the method may further comprise determining a quality level of the sensor data from one or more auxiliary sensors and adapting the extraction of the one or more temporal features according to the detected quality levels. The method may further comprise receiving audio data captured from output from a microphone associated with the video camera. In another embodiment, the sensor data and video data are received simultaneously and/or captured simultaneously. In another embodiment, the association of the sensor data and video data is caused using timestamp data. In another embodiment, the temporal features extracted from the video data are space-time interest points. In another embodiment, the temporal features extracted from the video data are one or more dense trajectories or any other features that describe motion of objects. In another embodiment, the method may comprise causing utilization of the temporal features for at least one of: classification, such as genre, event detection, object detection, gesture detection, event or object matching between different videos or any other semantic analysis which uses motion information.

In another embodiment, when less than a predetermined threshold of camera view motion is detected, or when less than a predetermined threshold of video data associated with the stable segments is present, the method may further comprise causing extraction of one or more temporal features from the video data, performing orientation compensation on the one or more temporal features, causing extraction of a direction and compensation amount, and performing, with a processor, camera view motion compensation on the orientation compensated temporal features using the direction and compensation amount.

In another embodiment, a method is provided comprising receiving video data captured from a camera device, receiving sensor data captured from auxiliary sensors associated with the camera device, causing association of the sensor data and the video data using time data, wherein each of one or more samples of sensor data is associated with a single video frame, causing extraction of one or more temporal features from the video data, performing orientation compensation on the one or more temporal features, causing extraction of a direction and compensation amount, and performing, with a processor, camera view motion compensation on the compensated temporal features using the direction and compensation amount. In another embodiment, the extraction of temporal features includes extracting space-time interest points (STIP). The orientation compensation may comprise aligning one or more descriptors, the descriptors related to the extracted STIP, with respect to a global vertical direction. Camera view motion compensation may comprise identifying a histogram bin describing an orientation to be modified according to the direction information and modifying the histogram bin according to the compensation amount.

An example apparatus may include at least one processor and at least one memory storing computer program code, wherein the at least one memory and stored computer program code are configured, with the at least one processor, to cause the apparatus to receive video data captured from a camera device, receive sensor data captured from auxiliary sensors associated with the camera device, cause association of the sensor data and the video data use time data, wherein each of one or more samples of sensor data is associated with a single video frame, detect camera view motion in the sensor data and cause segmentation of the sensor data into stable segments, extract one or more temporal features from the video data associated with the stable segments of the sensor data. The at least one memory and stored computer program code are further configured, with the at least one processor, to cause the apparatus to perform orientation compensation on the one or more temporal features. In one embodiment, sensor data may be data output by motion sensors, sensor data may describe both camera motion and zoom, and the at least one memory and stored computer program code are further configured, with the at least one processor, to cause the apparatus to determine a quality level of the sensor data from one or more auxiliary sensors and adapt the extraction of the one or more temporal features according to the detected quality levels. The at least one memory and stored computer program code are further configured, with the at least one processor, to cause the apparatus to receive audio data captured from output from a microphone associated with the video camera. In another embodiment, the sensor data and video data are received simultaneously and/or captured simultaneously. In another embodiment, the association of the sensor data and video data is caused using timestamp data. In another embodiment, the temporal features extracted from the video data are space-time interest points. In another embodiment, the temporal features extracted from the video data are one or more dense trajectories or any other features that describe motion of objects. In another embodiment, the at least one memory and stored computer program code are further configured, with the at least one processor, to cause the apparatus to cause utilization of the temporal features for at least one of: classification, event detection, object detection, gesture detection, event or object matching between different videos or any other semantic analysis which uses motion information.

In another embodiment, when less than a predetermined threshold of view-motion is detected, or when less than a predetermined threshold of video data associated with the stable segments is present, the at least one memory and stored computer program code are further configured, with the at least one processor, to cause the apparatus to cause extraction of one or more temporal features from the video data, perform orientation compensation on the one or more temporal features, cause extraction of a direction and compensation amount, and perform, with a processor, camera view motion compensation on the orientation compensated temporal features using the direction and compensation amount.

In another embodiment, an apparatus is provided that may include at least one processor and at least one memory storing computer program code, wherein the at least one memory and stored computer program code are configured, with the at least one processor, to cause the apparatus to receive video data captured from a camera device, receive sensor data captured from auxiliary sensors associated with the camera device, cause association of the sensor data and the video data use time data, wherein each of one or more samples of sensor data is associated with a single video frame, cause extraction of one or more temporal features from the video data, perform orientation compensation on the one or more temporal features, cause extraction of a direction and compensation amount, and perform, with a processor, camera view motion compensation on the compensated temporal features use the direction and compensation amount. In another embodiment, the extraction of temporal features includes extracting space-time interest points (STIP). The orientation compensation may comprise aligning one or more descriptors, the descriptors related to the extracted STIP, with respect to a global vertical direction. Camera view motion compensation may comprise identifying a histogram bin describing an orientation to be modified according to the direction information and modifying the histogram bin according to the compensation amount.

In a further embodiment, an apparatus or a computer program product is provided that includes at least one non-transitory computer-readable storage medium having computer-readable program instructions stored therein, the computer-readable program instructions includes program instructions configured to receive video data captured from a camera device, receive sensor data captured from auxiliary sensors associated with the camera device, cause association of the sensor data and the video data use time data, wherein each of one or more samples of sensor data is associated with a single video frame, detect camera view motion in the sensor data and cause segmentation of the sensor data into stable segments, extract one or more temporal features from the video data associated with the stable segments of the sensor data. The computer-readable program instructions also include program instructions configured to cause the apparatus to perform orientation compensation on the one or more temporal features. In one embodiment, sensor data may be data output by motion sensors, sensor data may describe both camera motion and zoom, and the computer-readable program instructions also include program instructions configured to cause the apparatus to determine a quality level of the sensor data from one or more auxiliary sensors and adapt the extraction of the one or more temporal features according to the detected quality levels. The computer-readable program instructions also include program instructions configured to cause the apparatus to receive audio data captured from output from a microphone associated with the video camera. In another embodiment, the sensor data and video data are received simultaneously and/or captured simultaneously. In another embodiment, the association of the sensor data and video data is caused using timestamp data. In another embodiment, the temporal features extracted from the video data are space-time interest points. In another embodiment, the temporal features extracted from the video data are one or more dense trajectories or any other features that describe motion of objects. In another embodiment, the at least one memory and stored computer program code are further configured, with the at least one processor, to cause the apparatus to cause utilization of the temporal features for at least one of: classification, event detection, object detection, gesture detection, event or object matching between different videos or any other semantic analysis which uses motion information.

In another embodiment, when less than a predetermined threshold of view-motion is detected, or when less than a predetermined threshold of video data associated with the stable segments is present, the computer-readable program instructions also include program instructions configured to cause the apparatus to cause extraction of one or more temporal features from the video data, perform orientation compensation on the one or more temporal features, cause extraction of a direction and compensation amount, and perform, with a processor, camera view motion compensation on the orientation compensated temporal features use the direction and compensation amount.

In another embodiment, a computer program product is provided that includes at least one non-transitory computer-readable storage medium having computer-readable program instructions stored therein, the computer-readable program instructions includes program instructions configured to cause the apparatus to receive video data captured from a camera device, receive sensor data captured from auxiliary sensors associated with the camera device, cause association of the sensor data and the video data use time data, wherein each of one or more samples of sensor data is associated with a single video frame, cause extraction of one or more temporal features from the video data, perform orientation compensation on the one or more temporal features, cause extraction of a direction and compensation amount, and perform, with a processor, camera view motion compensation on the compensated temporal features use the direction and compensation amount. In another embodiment, the extraction of temporal features includes extracting space-time interest points (STIP). The orientation compensation may comprise aligning one or more descriptors, the descriptors related to the extracted STIP, with respect to a global vertical direction. Camera view motion compensation may comprise identifying a histogram bin describing an orientation to be modified according to the direction information and modifying the histogram bin according to the compensation amount.

One example apparatus may include means for receiving video data captured from a camera device, receiving sensor data captured from auxiliary sensors associated with the camera device, causing association of the sensor data and the video data using time data, wherein each of one or more samples of sensor data is associated with a single video frame, detecting camera view motion in the sensor data and causing segmentation of the sensor data into stable segments, extracting one or more temporal features from the video data associated with the stable segments of the sensor data. The apparatus may also include means for performing orientation compensation on the one or more temporal features. In one embodiment, sensor data may be data output by motion sensors, sensor data may describe both camera motion and zoom, and the apparatus may further include means for determining a quality level of the sensor data from one or more auxiliary sensors and adapting the extraction of the one or more temporal features according to the detected quality levels. The apparatus may also include means for receiving audio data captured from output from a microphone associated with the video camera. In another embodiment, the sensor data and video data are received simultaneously and/or captured simultaneously. In another embodiment, the association of the sensor data and video data is caused using timestamp data. In another embodiment, the temporal features extracted from the video data are space-time interest points. In another embodiment, the temporal features extracted from the video data are one or more dense trajectories or any other features that describe motion of objects. In another embodiment, the apparatus may also include means for causing utilization of the temporal features for at least one of: classification, event detection, object detection, gesture detection, event or object matching between different videos or any other semantic analysis which uses motion information.

In another embodiment, when less than a predetermined threshold of view-motion is detected, or when less than a predetermined threshold of video data associated with the stable segments is present, the apparatus may also include means for causing extraction of one or more temporal features from the video data, performing orientation compensation on the one or more temporal features, causing extraction of a direction and compensation amount, and performing, with a processor, camera view motion compensation on the orientation compensated temporal features using the direction and compensation amount.

In another embodiment, an apparatus is provided that may include means for receiving video data captured from a camera device, receiving sensor data captured from auxiliary sensors associated with the camera device, causing association of the sensor data and the video data using time data, wherein each of one or more samples of sensor data is associated with a single video frame, causing extraction of one or more temporal features from the video data, performing orientation compensation on the one or more temporal features, causing extraction of a direction and compensation amount, and performing, with a processor, camera view motion compensation on the compensated temporal features using the direction and compensation amount. In another embodiment, the extraction of temporal features includes extracting space-time interest points (STIP). The orientation compensation may comprise aligning one or more descriptors, the descriptors related to the extracted STIP, with respect to a global vertical direction. Camera view motion compensation may comprise identifying a histogram bin describing an orientation to be modified according to the direction information and modifying the histogram bin according to the compensation amount.

BRIEF DESCRIPTION OF THE DRAWINGS

Figure 1:
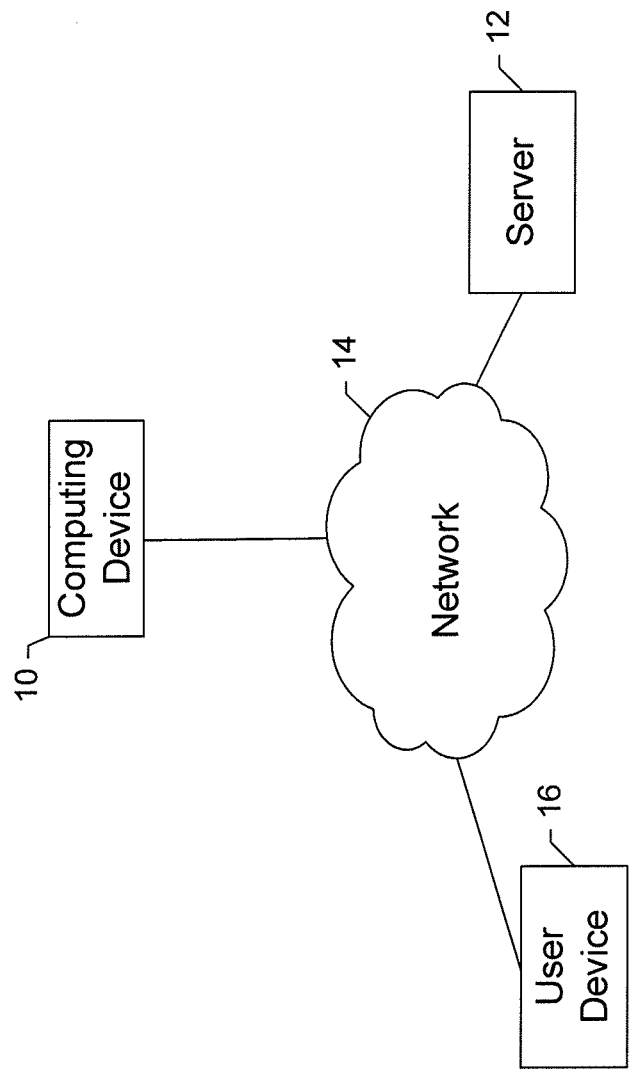
Figure 2:
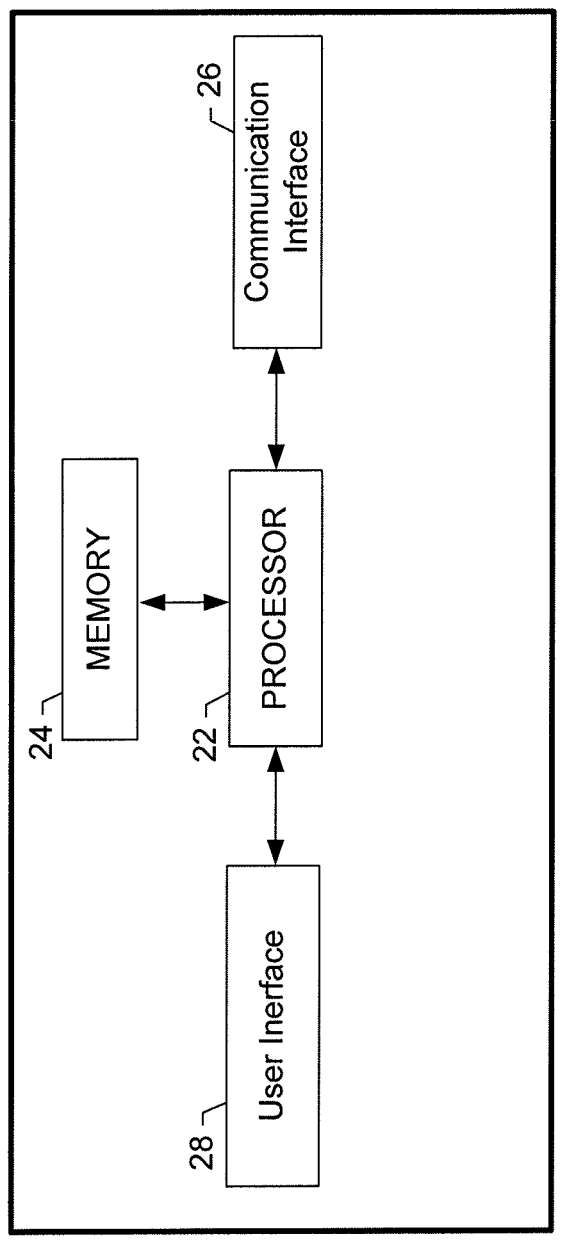
Figure 3:
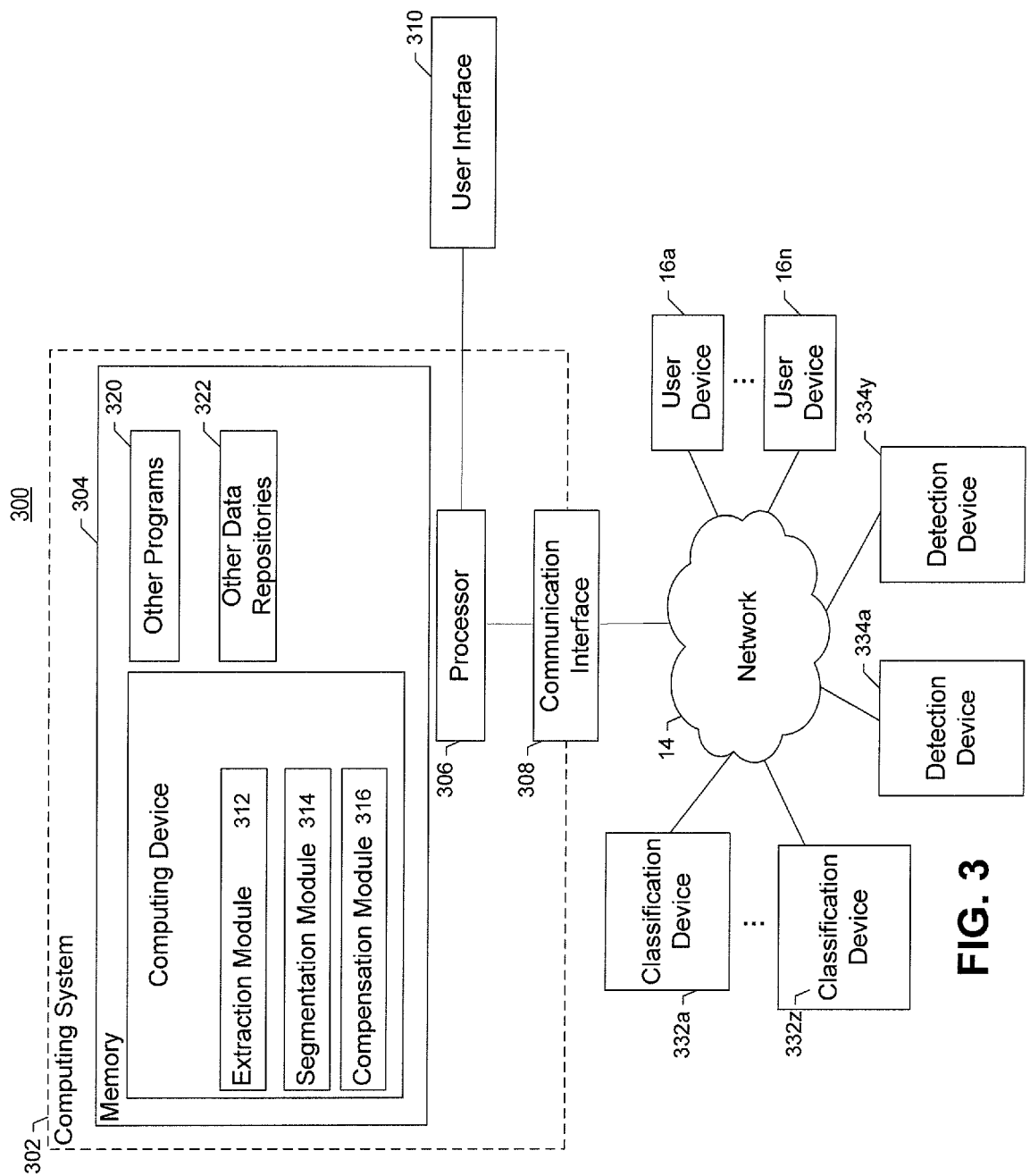

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a schematic representation of a system that may support communications in accordance with an example embodiment of the present invention.

Figure 4:
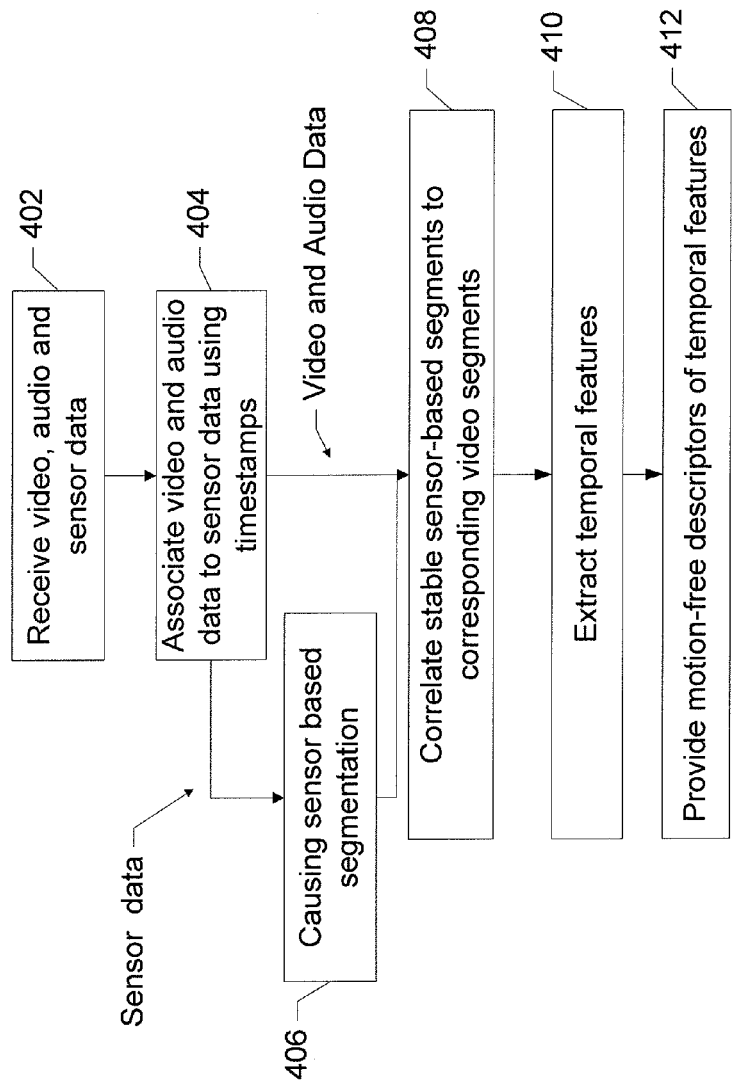
Figure 5:
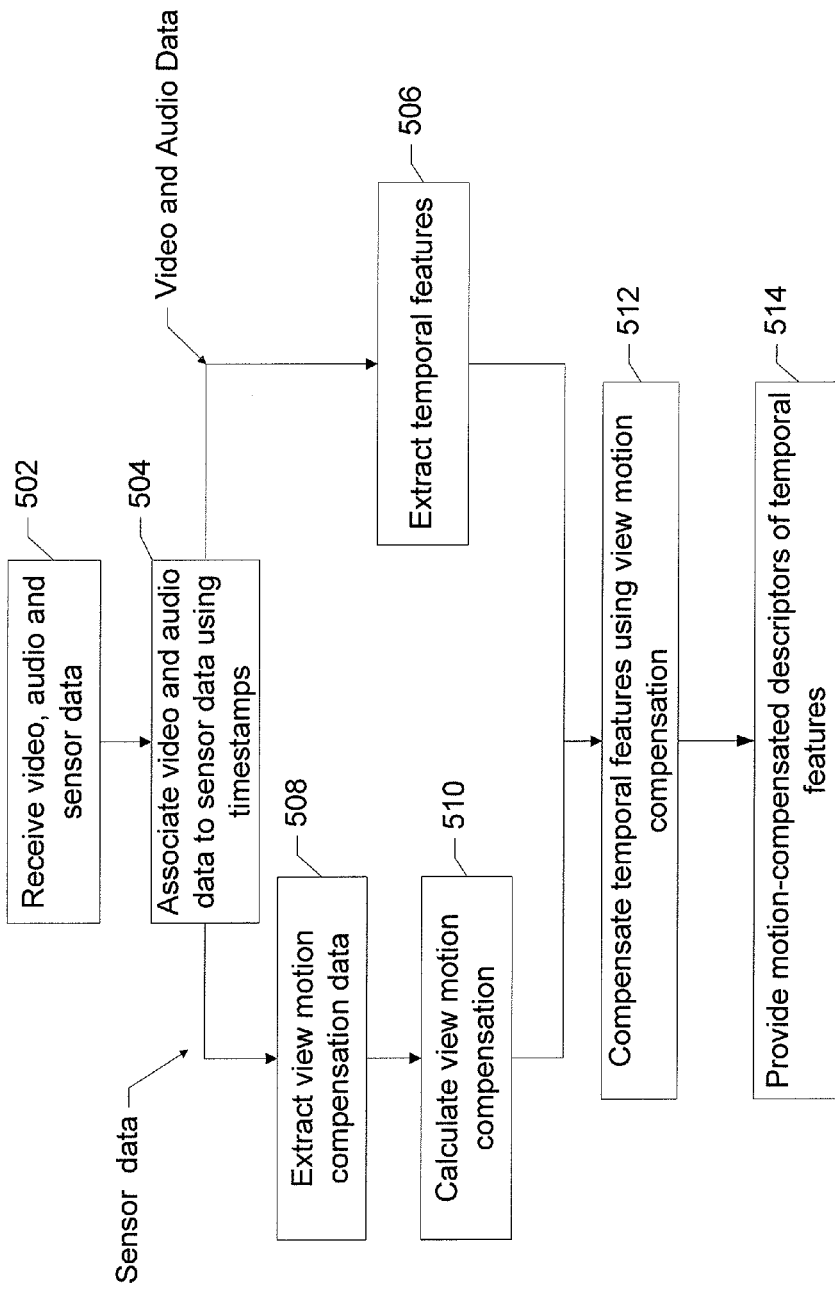
Figure 6:
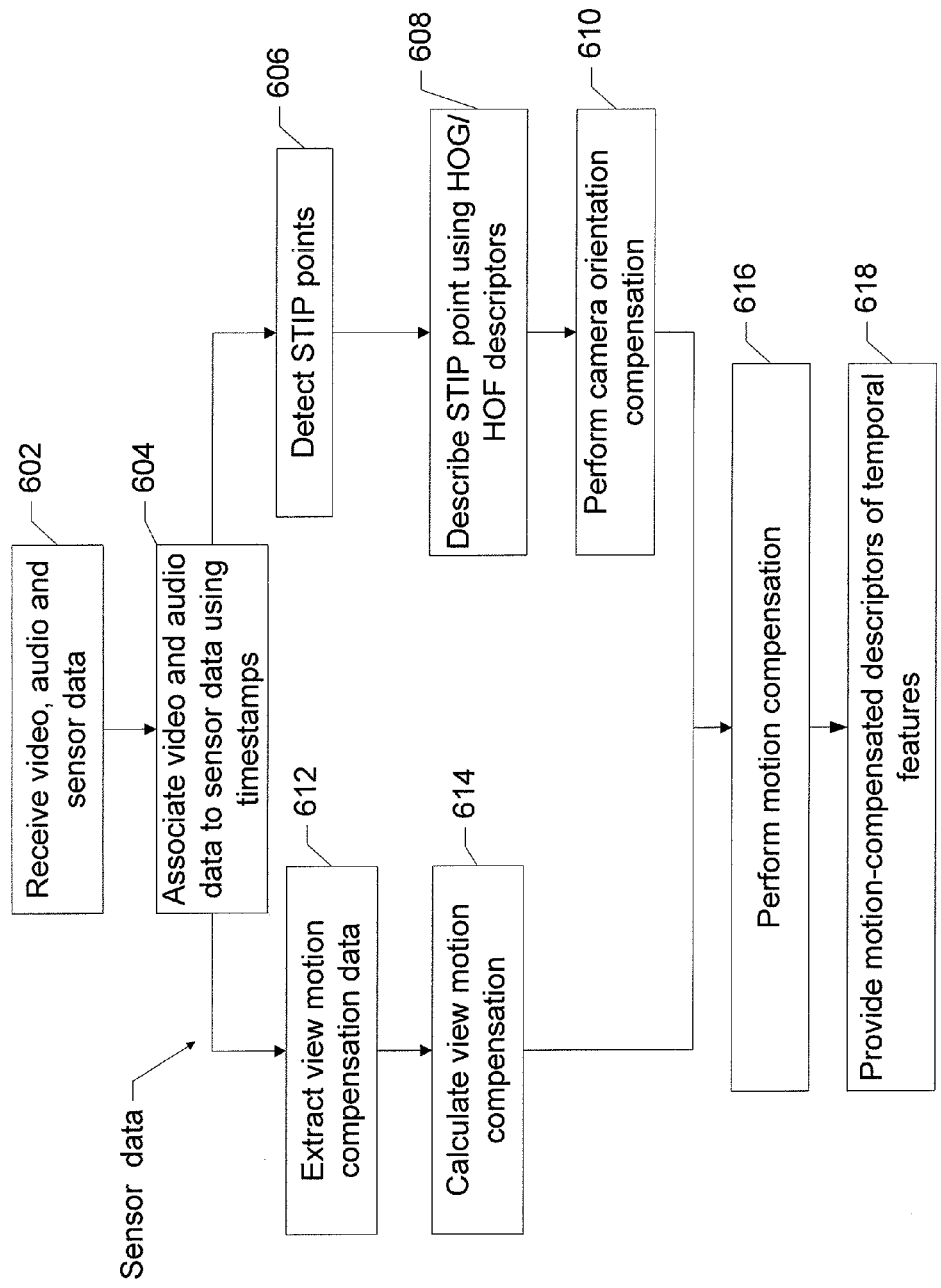
Figure 7:
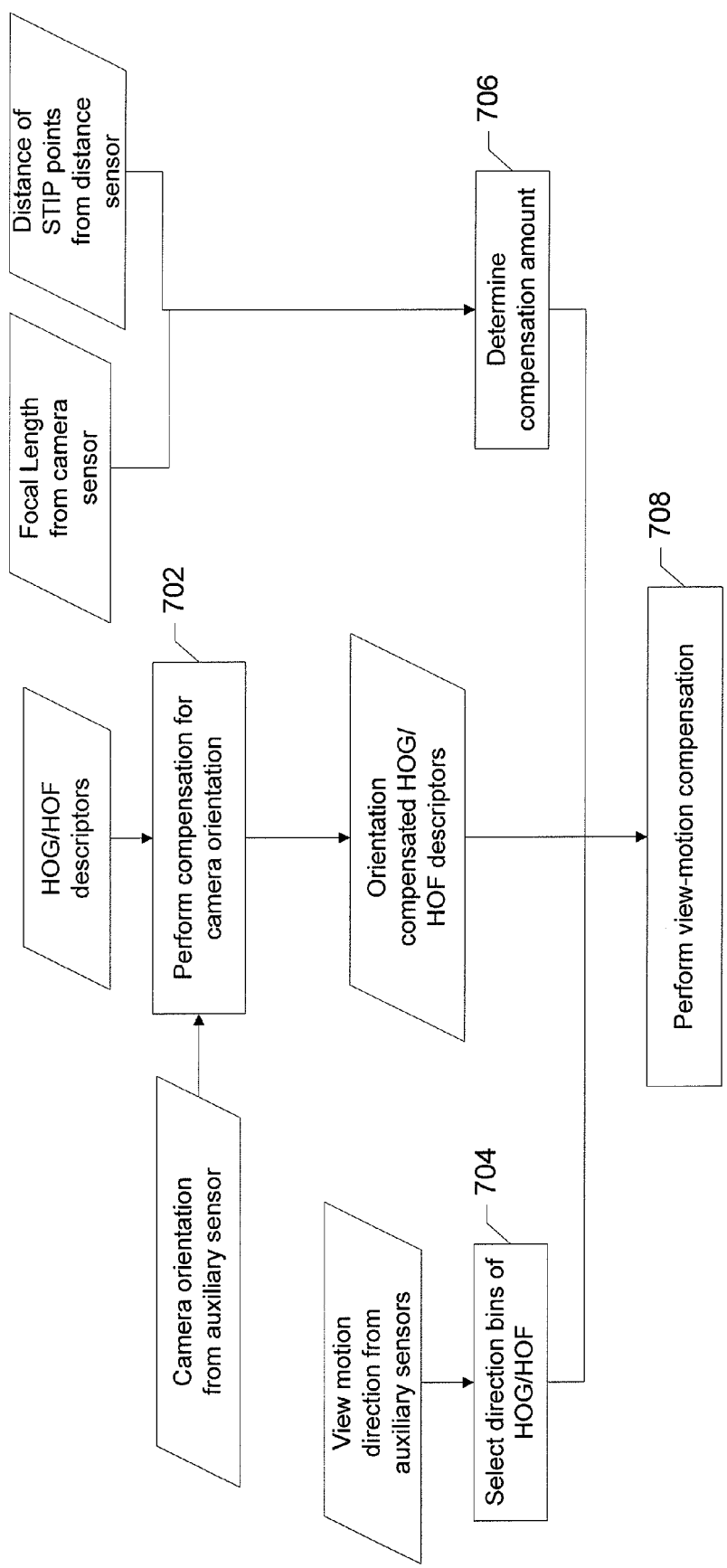
Figure 8:
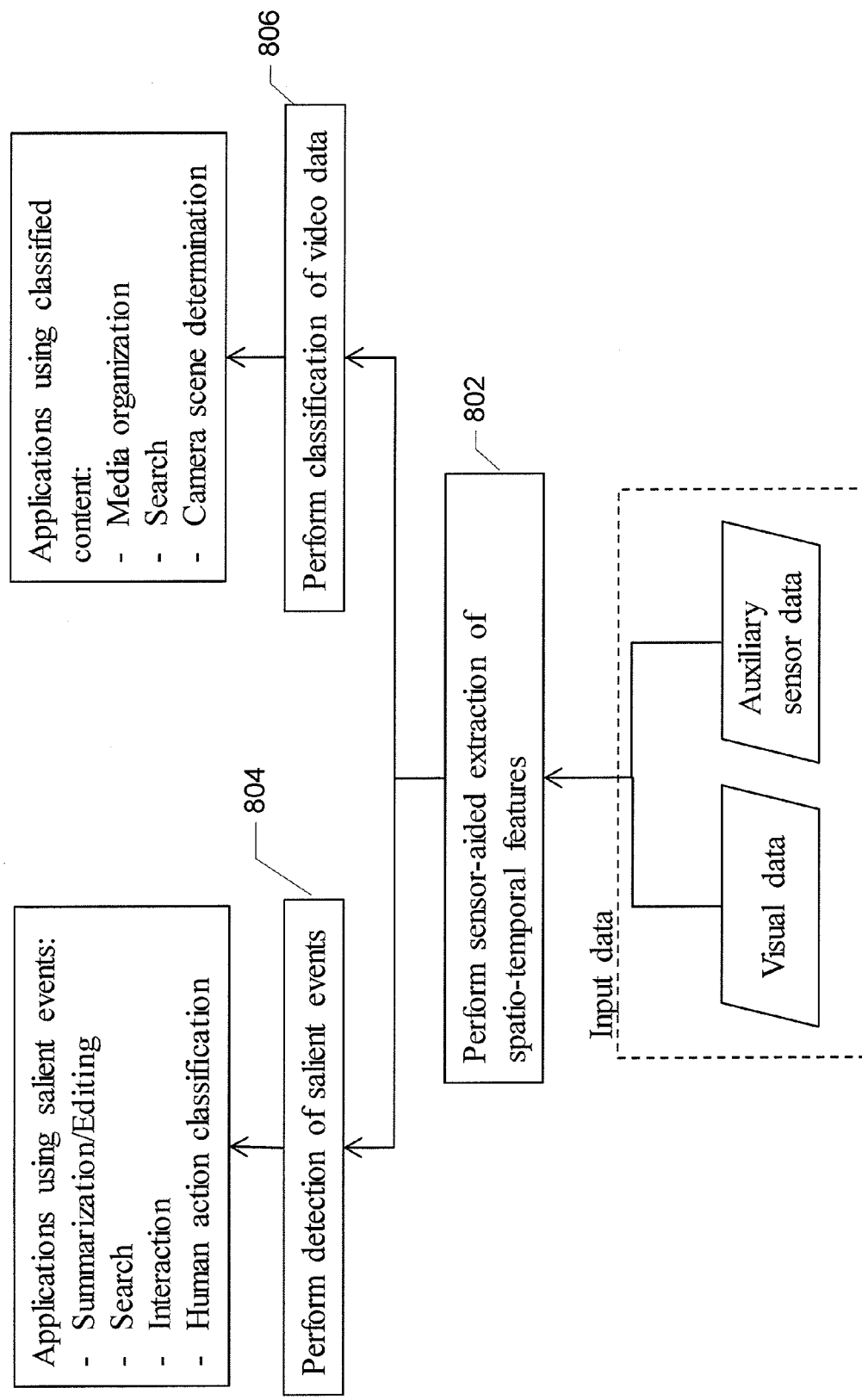

FIG. 4 is a flow chart illustrating operations performed, such as by the apparatus of FIG. 2, in accordance with an example embodiment of the present invention;

FIG. 5 is a flow chart illustrating operations performed, such as by the apparatus of FIG. 2, in accordance with an example embodiment of the present invention;

FIG. 6 is a flow chart illustrating operations performed, such as by the apparatus of FIG. 2, in accordance with an example embodiment of the present invention;

FIG. 7 a flow chart illustrating operations performed, such as by the apparatus of FIG. 2, in accordance with an example embodiment of the present invention; and FIG. 8 is an example flowchart illustrating a method of creating and assigning roles in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now of FIG. 1, a system that supports communication, either wirelessly or via a wireline, between a computing device 10 and a server 12 or other network entity (hereinafter generically referenced as a "server") and mobile terminal 16 is illustrated. As shown, the computing device, the server, and the mobile terminal 16 may be in communication via a network 14, such as a wide area network, such as a cellular network or the Internet or a local area network. However, the computing device, the server, and the mobile terminal may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server and a single mobile terminal, the server may be comprised of a plurality of servers which may collaborate to support browsing activity conducted by the computing device. The system may support a plurality of mobile terminals such as personal digital assistants (PDA), mobile telephones, smartphones, laptop computers, tablet computers, or any combination of the aforementioned, and other types of voice and text communications systems, and each may comprise video, audio and sensor recording capabilities.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. It should be noted that while FIG. 4 illustrates one example of a configuration of an apparatus, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, in an instance in which the processor is embodied as an ASIC, FPGA or the like, the processor may be specifically configured hardware for conducting the operations described herein. Alternatively, as another example, in an instance in which the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

The following description provides a two part process for overcoming the limitations of video temporal features which are corrupted by camera view motion. In particular, the two parts of the process are computationally efficient because they only analyze auxiliary sensor data, which is lightweight, in addition to the extraction of temporal features. The following description uses the term "auxiliary sensor data", which is described herein. In addition to camera and microphones, modern media capturing systems, e.g., smartphones, embed additional sensors such as electronic compass (magnetometer), accelerometer, gyroscope, etc. We refer to these sensors as "auxiliary sensors". These types of auxiliary sensors are able to provide information about the orientation and motion of the capturing device. In particular, compasses describe horizontal rotational movements, accelerometers can describe the vertical orientation (tilt) of the device (by exploiting the gravitation acceleration), gyroscope can describe the device velocity in 3D space, etc. We sample data output by these sensors using a sufficiently high sampling rate so that the motion of the recording device can be accurately described. More details about the considered auxiliary sensors will be given in the next section. Furthermore, for the following description, the information about camera zoom level is also considered auxiliary sensor data. This information may be signaled directly by the camera sensor without any video content analysis.

For the sake of simplicity, in the following "auxiliary sensors" may be referred to as "sensors" and the whole multimodal recording device may be referred to just as the "camera". Furthermore, both the camera motion (e.g. panning, tilting, etc.) and the changes of zoom level may be referred to just as "camera view motion", because both camera motion and zooming operation may have the effect of changing the information about the real motion of the recorded objects or scene. In addition, "camera view motion" includes any changes which affect the motion features and that are triggered by the recording device (ex. Change in camera capture settings like focus, etc.).

FIG. 3 is a schematic representation 300 of an example media content processing system 302 in accordance with an embodiment of the present invention. Apparatus 20 may be embodied by media content processing system 302 configured to employ an example embodiment of the present invention. In particular the media content processing system 302 may be configured to receive a plurality of media content (e.g. audio records, video segments, photographs and/or the like) from one or more user devices 16a and 16n. The received media content may be linked, classified and/or somehow associated with a particular, or predefined, public event (e.g. private performance, theater, sporting event, concert and/or the like) and/or the received media content may alternatively be unlabeled or unclassified. The received media content may also include sensor data (e.g. data captured by a visual sensor, an audio sensor, a compass, an accelerometer, a gyroscope or a global positioning system receiver) that was captured at the time the media content was captured, however in some embodiments the sensor data may also be received separately.

In some example embodiments, the user devices 16a and 16n may be a mobile communication devices such as, for example, a mobile telephone, smartphone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network.

In the embodiment shown, system 302 comprises a computer memory ("memory") 304, one or more processors 306 (e.g. processing circuitry) and a communications interface 308. The computing device(s) are shown residing in memory 304. In other embodiments, some portion of the contents, some or all of the components of the system 302 may be stored on and/or transmitted over other computer-readable media. Other code or programs 320 (e.g., an administrative interface, a Web server, and the like) and potentially other data repositories, such as data repository 322, also reside in the memory 304, and preferably execute on processor 306. Of note, one or more of the components in FIG. 3 may not be present in any specific implementation.

In a typical embodiment, as described above, media content processing system 302 may include an extraction module 312, a segmentation module 314, and a compensation module 316. The extraction module 312, the segmentation module 314, and the compensation module 316 or a combination thereof may perform functions such as those outlined in FIG. 1. The system 302 interacts via the network 14 via a communications interface 308 with (1) user devices 16a-16n, (2) classification devices 332a-332z and/or (3) detection devices 334a-334y. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the system 302 may be implemented using standard programming techniques. For example, the system 302 may be implemented as a "native" executable running on the processor 306, along with one or more static or dynamic libraries. In other embodiments, the system 302 may be implemented as instructions processed by a virtual machine that executes as one of the other programs 320. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system 302, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the system 302 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations The extraction module 312 may be configured to extract temporal features from video data. The extraction may occur from stable segments if stable segments have been detected or from the video data as a whole. Furthermore, the segmentation module 314 may be configured to segment sensor data into stable data streams and/or unstable data streams based on the captured sensor data. The compensation module 316 may be configured to perform camera view motion compensation and/or orientation compensation.

Alternatively or additionally the extraction, segmentation, and/or compensation of data may be done in real time or near real time as the data (context and/or media) is continuously received. Each mobile device may be configured to send either the raw sensor data (visual, audio, compass, accelerometer, gyroscope, GPS, etc.) or features that may be extracted, segmented, and/or compensated of data from such data regarding the media content recorded by only the considered device, such as average brightness of each recorded media content event, average brightness change rate of each recorded video.

Alternatively or additionally, the extraction, segmentation, and/or compensation of data may be partially resolved by each mobile terminal, without the need of uploading or transmitting any data (context or media) other than the final result, and then the collective results may be analyzed. In other words the extraction module 312, the segmentation module 314, and/or the compensation module, 316 may be located on the mobile terminal 10, or may alternatively be located on a remote server.

Data modalities considered in this invention are those captured by the camera(s) (visual data), by the microphone(s) (audio data) and by auxiliary sensors such as electronic compass, accelerometer, gyroscope, Global Positioning System (GPS) receiver, Indoor Positioning sensor (including but not limited to neighborhood WiFi Access Points, Blue-Tooth IDs, etc.) or any other suitable positioning method, etc. Also, we consider zoom level information to be part of the auxiliary sensor data because it can be signaled from the camera module to the computing unit (which performs the analysis) in the same way as other sensor data is signaled.

In addition, the system 300 may comprise one or more distinct computing systems/devices and may span distributed locations. Furthermore, each block shown may represent one or more such blocks as appropriate to a specific embodiment or may be combined with other blocks. In other example embodiments, the modules 312, 314, and 316 may be configured to operate on separate systems (e.g. a mobile terminal and a remote server, multiple remote servers and/or the like). Also, the media content processing system 300 may be implemented in software, hardware, firmware, or in some combination to achieve the capabilities described herein.

While the system may be employed, for example, by a computing device 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

FIGS. 4, 5, 6, 7, and 8 are flow charts illustrating operations performed, such as by the apparatus 20 of FIG. 2 or apparatus 302 of FIG. 3, in accordance with an example embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4, 5, 6, 7, and 8, when executed, convert a computer or processing circuitry into a particular machine configured to perform an example embodiment of the present invention. Accordingly, the operations of FIGS. 4, 5, 6, 7, and 8 define an algorithm for configuring a computer or processing to perform an example embodiment. In some cases, a general purpose computer may be provided with an instance of the processor which performs the algorithms of FIGS. 4, 5, 6, 7, and 8 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 shows a flow chart illustrating operations performed, such as by the apparatus 20, in accordance with an example embodiment of the present invention. Specifically, FIG. 4 shows an example embodiment for, for example, extracting temporal features from stable segments of the video data.

In one embodiment of the present invention, apparatus 20 may include means for recording data. The recorded data may comprise video data, picture data, audio data, and/or auxiliary sensor data. In one embodiment, the data is recorded by independent participants at the event. In one embodiment, one or more recording devices are used at the same event by one or more people. Such devices are able to (simultaneously) record videos (and their associated audio content) and capture auxiliary data. Auxiliary data is captured by auxiliary sensors. "Auxiliary sensors" are any other sensors, apart from camera and microphone, which provide additional data that can be associated to the recorded media (image, video, audio, 3D video, 3D audio, cinemagraph, etc.). Such sensors can be embedded within the media recording device (for sensors such as electronic compasses, accelerometers, gyroscopes and positioning devices), or, in the case of a positioning device such as a GPS receiver, it can be incorporated within another device carried by the same person who records the media, or it can even be a wearable device. The zoom level may be signaled directly by the camera module, so no additional sensor is required for providing such information.

Compasses measure the horizontal orientation with respect to the magnetic north. Accelerometers measure the acceleration on each of three orthogonal axes. Gyroscopes measure the angular velocity and, by integration, the orientation. A positioning device (such as a GPS receiver) measures the location of the device itself. In one embodiment, auxiliary data and video/audio content data are temporally aligned to each other. In addition, data captured by multiple recording devices may be temporally aligned to each other.

As shown in block 402 of FIG. 4, the apparatus 20 embodied by the computing device 10 may also be configured to receive the recorded data. Thus, the apparatus may include means, such as the processor 22 or the like, for causing the reception of the recorded data. Additionally or alternatively, the apparatus 20 may be configured to receive video data, audio data, and/or auxiliary sensor data.

As shown in block 404 of FIG. 4, the apparatus 20 may also be configured to associate video data and/or audio data with sensor data using time data. Thus, the apparatus may include means, such as the processor 22 or the like, for causing the associated of video data and/or audio data with sensor data using time data. By way of example, the data output by auxiliary sensors may be associated to the corresponding media content (audio and video) by using timestamps, so that each sample of auxiliary sensor data can be associated without ambiguity to only one video frame and audio sample. This may be realized by using the same clock for obtaining the timestamps for auxiliary sensor data, video data and audio data. In another embodiment, other methods for time-aligning the media and sensor samples may be used based on the hardware and network availability, such as using network time, GPS time, distributed clocks, etc.

As shown in block 406 of FIG. 4, the apparatus 20 may also be configured to cause sensor data based segmentation of the sensor data. Thus, the apparatus may include means, such as the processor 22 or the like, for causing sensor data based segmentation of the sensor data.

In one embodiment, the sensor data associated to the input video may be analyzed in order to obtain information about the motion of the recording device and about the zoom level change. In one embodiment, one or both of intentional camera motion (such as camera panning and tilting) and unintentional camera motion (either any camera shake degree or only medium to strong shake) may be detected. Camera panning may be detected by using either compasses or gyroscopes. Camera tilting movements may be detected by using either accelerometers or gyroscopes. Detection of zoom-level changes may be made for the part of or the whole duration of the data stream.

Sensor-based camera motion analysis may be performed for a portion of or the whole length of the data stream output by the auxiliary sensors during the recording of a video. In an embodiment where sensor-based camera motion analysis is performed for the whole length of the data stream, information about the camera movements and camera shakes for the whole extent of the video may be obtained.

In one embodiment, information related to the camera view motion may be used to segment the auxiliary sensor data stream into "segments with camera view motion" (i.e., any combination of intentional camera motion, shake and zoom-change) and "stable segments", i.e. segments without or with low camera view motion. The timestamps of those segments which are classified as stable may then be stored.

As shown in block 408 of FIG. 4, the apparatus 20 may also be configured to correlate segments of sensor data to corresponding video segments. Thus, the apparatus may include means, such as the processor 22 or the like, for causing correlation of segments of sensor data to corresponding video segments.

Continuing the example from above, the stored timestamps may be used for selecting the stable segments of visual data, which are to be used in the subsequent steps.

As shown in block 410 of FIG. 4, the apparatus 20 may also be configured to extract temporal features. Thus, the apparatus may include means, such as the processor 22 or the like, for causing extraction of temporal features.

By way of the example above, the segments of visual data that are correlated to the stable segments may then be analyzed in order to detect temporal features such as Space-Time Interest Points (STIP) and/or dense trajectories or other similar temporal features. In one embodiment, the original descriptors of these features, may then be used in the subsequent analysis steps (such as for classification, event detection, etc.) without being modified, because they describe features extracted from stable video segments, thus they may describe the actual motion of objects present in the video content.

As shown in block 412 of FIG. 4, the apparatus 20 may also be configured to provide motion-free descriptors of the temporal features. Thus, the apparatus may include means, such as the processor 22 or the like, for providing motion-free descriptors of the temporal features.

In one embodiment, if the input video is affected by high camera view motion during its length, the stable video segments selected by the process described in FIG. 4 may be very short or, there may be no stable video segments at all or only few stable video segments. As a consequence, the number of features extracted from the video may be very few and may not be sufficient for being effectively used in subsequent analysis steps. FIG. 5 shows a flow chart illustrating operations performed, such as by the apparatus 20, in accordance with an example embodiment of the present invention. Specifically, FIG. 5 shows an example embodiment of describing a process to extract temporal features from the original visual data as if there was no camera view motion and to then account for the camera view motion when building the feature descriptors.

As shown in block 502 of FIG. 5, the apparatus 20 may also be configured to receiving the recorded data. Thus, the apparatus may include means, such as the processor 22 or the like, for causing the reception of the recorded data. Additionally or alternatively, the apparatus 20 may be configured to receive video data, audio data, and/or auxiliary sensor data.

As shown in block 504 of FIG. 5, the apparatus 20 may also be configured to associate the video data and/or the audio data with the sensor data using time data. Thus, the apparatus may include means, such as the processor 22 or the like, for causing the associated of video data and/or audio data with sensor data using time data. By way of example, the data output by auxiliary sensors may be associated to the corresponding media content (audio and video) by using timestamps, so that each sample of auxiliary sensor data can be associated without ambiguity to only one video frame and audio sample. This may be realized by using the same clock for obtaining the timestamps for auxiliary sensor data, video data and audio data. In another embodiment, other methods for time-aligning the media and sensor samples may be used based on the hardware and network availability, such as using network time, GPS time, distributed clocks, etc.

As shown in block 506 of FIG. 5, the apparatus 20 may also be configured to extract temporal features from the video data. Thus, the apparatus may include means, such as the processor 22 or the like, for causing extraction of temporal features from the video data.

By way of example, when the amount of camera view motion is high for a large part of the video data, the temporal features extracted from detected stable video segments may not be sufficient providing motion free temporal features. In one embodiment, temporal features are detected from the whole video length, or from representative frames or segments of the video, and then the information provided by the auxiliary sensors is used for modifying the feature-descriptors so that they are made independent from camera view motion.

As such, as shown in block 508 of FIG. 5, the apparatus 20 may also be configured to extract camera view motion compensation data. Thus, the apparatus may include means, such as the processor 22 or the like, for causing the extraction of camera view motion compensation data.

As shown in block 510 of FIG. 5, the apparatus 20 may also be configured to calculate camera view motion compensation data. Thus, the apparatus may include means, such as the processor 22 or the like, for causing the calculation of camera view motion compensation data.

As shown in block 512 of FIG. 5, the apparatus 20 may also be configured to cause the compensation of the temporal features using the camera view motion compensation data. Thus, the apparatus may include means, such as the processor 22 or the like, for causing the compensation of the temporal features using the camera view motion compensation data.

As shown in block 514 of FIG. 5, the apparatus 20 may also be configured to provide motion compensated descriptors of the temporal features. Thus, the apparatus may include means, such as the processor 22 or the like, for providing motion compensated features of the temporal features.

Alternatively, in one embodiment, FIG. 5 may be utilized for modifying (and thus compensating) the values of the computed features before computing their descriptors.

FIG. 6 shows a flow chart illustrating operations performed, such as by the apparatus 20, in accordance with an example embodiment of the present invention. Specifically, FIG. 6 shows an example embodiment of the process shown in FIG. 5. Thus, details of how the method of FIG. 5 may be applied are shown in FIG. 6, using, as a way of example, an existing temporal feature, specifically, Space-Time Interest Points (STIP).

As shown in block 602 of FIG. 6, the apparatus 20 may also be configured to receiving the recorded data. Thus, the apparatus may include means, such as the processor 22 or the like, for causing the reception of the recorded data. Additionally or alternatively, the apparatus 20 may be configured to receive video data, audio data, and/or auxiliary sensor data.

As shown in block 604 of FIG. 4, the apparatus 20 may also be configured to associate the video data and/or the audio data with the sensor data using time data. Thus, the apparatus may include means, such as the processor 22 or the like, for causing the associated of video data and/or audio data with sensor data using time data. By way of example, the data output by auxiliary sensors may be associated to the corresponding media content (audio and video) by using timestamps, so that each sample of auxiliary sensor data can be associated without ambiguity to only one video frame and audio sample. This may be realized by using the same clock for obtaining the timestamps for auxiliary sensor data, video data and audio data. In another embodiment, other methods for time-aligning the media and sensor samples may be used based on the hardware and network availability, such as using network time, GPS time, distributed clocks, etc.

As shown in block 606 of FIG. 6, the apparatus 20 may also be configured to detect Space Time Interest Points. Thus, the apparatus may include means, such as the processor 22 or the like, for causing the detection of Space Time Interest Points.

In one embodiment, Space Time Interest Points (STIP) may be detected by extending the 2D Harris detector to the spatio-temporal domain and obtaining a 3D Harris detector. This operator may then be implemented by computing a second-moment matrix at each video point, using independent spatial and temporal scales, a separable Gaussian smoothing function and space-time gradients. The space-time interest points may be obtained by searching for local maxima of the operator.

As shown in block 608 of FIG. 6, the apparatus 20 may also be configured to describe STIP points using HOG/HOF descriptors. Thus, the apparatus may include means, such as the processor 22 or the like, for causing the building of descriptors of the STIP points.

Continuing the example from above, after the interest points are detected, their surrounding volumes may then be considered for building the descriptors. In one embodiment, there may be one descriptor for each interest point. Each volume is subdivided in order to form a grid of a certain number of cells. The number of cells is $n_x \times n_y \times n_t$. In one example $n_x=3$, $n_y=3$, $n_t=2$, such as in the version proposed by the authors of STIP, for respectively the spatial x, spatial y and temporal t dimension). Each volume may then be described by a HOG/HOF descriptor (HOG=Histogram of Oriented Gradients, HOF=Histogram of Optical Flow). In particular, the HOG part may incorporate only appearance information, and the HOF part may incorporate the motion information.

Each volume may then be described by a HOG/HOF descriptor (HOG=Histogram of Oriented Gradients, HOF=Histogram of Optical Flow). In particular, the HOG part may incorporate only appearance information, and the HOF part may incorporate the motion information.

As shown in block 610 of FIG. 6, the apparatus 20 may also be configured to perform camera orientation compensation. Thus, the apparatus may include means, such as the processor 22 or the like, for causing the performance of camera orientation compensation.

For exemplary purposes, as a pre-processing step, each descriptor may be aligned with respect to the global vertical direction. Alignment may be achieved using the information provided by the accelerometer data for rotating the descriptor. In particular, the accelerometer senses the gravitation acceleration which is always vertical (i.e. directed towards the center of mass of the Earth). In this way the descriptor may be moved to a reference coordinate system which may aid in effectively performing the compensation with respect to camera view motion information provided by the auxiliary sensors which is available in the reference coordinate system. Furthermore, the compensation with respect to the camera orientation may be useful also in case an application would need to compare descriptors generated by different cameras (or different videos recorded by the same camera at different times) recording the same object from which interest points are detected. For example, in a sport genre classification application, videos and associated auxiliary sensor data that may be captured by different users may then be collected in a central server and analyzed jointly for inferring the sport type. This may be done by classifying the descriptors of STIP features extracted from different videos. However, if these descriptors are not compensated with respect to the specific orientation that a certain camera had at the moment of recording, the use of the descriptors inside a classifier may lead to inaccurate results. This may be because the HOG/HOF descriptor (and other descriptor-types used in computer vision) is not rotationally invariant.

As shown in block 612 of FIG. 6, the apparatus 20 may also be configured to extract camera view motion compensation data. Thus, the apparatus may include means, such as the processor 22 or the like, for causing extraction of camera view motion compensation data.

As shown in block 614 of FIG. 6, the apparatus 20 may also be configured to calculate camera view motion compensation. Thus, the apparatus may include means, such as the processor 22 or the like, for causing the calculation of camera view motion compensation.

The camera view motion compensation, which may be applied to the HOF part of the HOG/HOF descriptor, because the HOF part incorporates the motion information, may factor in the following information: the bins that have to be modified (i.e. the motion-directions that need to be compensated) and the amount of compensation that has to be applied. The direction-bins may be obtained from the direction of the camera view motion; in particular, the bins encoding the direction which is opposite to the camera view motion need to be modified (because if the camera moves left, the recorded scene moves right). The camera view motion direction may be obtained by analyzing the data output by the auxiliary sensors previously introduced: compass, accelerometer, gyroscopes and zoom level sensor (i.e. camera sensor).

For example, if the camera view motion direction is purely horizontal-left, only the bin encoding the horizontal-right direction of the motion is selected for being compensated. The amount of compensation is proportional to the effect that the camera view motion has on the considered interest point. This effect depends mainly on the speed and acceleration of camera view motion, on the focal length of the camera and on the distance of the interest point from the camera lenses. The focal length information is obtained directly from the camera. The distance between the physical location of the interest point and the camera can be estimated by any suitable distance measurement technique, such as a Light Detection and Ranging sensor (LIDAR), camera arrays, light field cameras, SONAR (or any other suitable technique) which can provide distances for all the image points.

In another embodiment, if such distances are not known, an alternative and simpler implementation consists of using the same amount of compensation for all the interest points of the same video frame, by taking into account only the speed and acceleration of the camera view motion. Additionally or alternatively, the focal length may be taken into account. The alternative solution may be considered an approximate solution and may thus provide less than perfect compensation results but may be expected to deliver better results than without any compensation with the advantage of not needing any extra distance measurement sensor.

As shown in block 616 of FIG. 6, the apparatus 20 may also be configured to perform motion compensation. Thus, the apparatus may include means, such as the processor 22 or the like, for causing the performance of motion compensation.

Continuing the example from above, the actual motion compensation is performed on the orientation-compensated HOG/HOF descriptors by using the direction-bins information and the compensation amount information. Each HOG/HOF descriptor may be made of two multi-dimensional histograms of dimensions $n_x \times n_y \times n_t \times n_h$, where $n_x \times n_y \times n_t$ is the number of cells (as previously mentioned) and $n_h$ is the number of histogram bins. In the HOF descriptor the histogram bins represent the motion directions, which may be obtained by uniformly sampling the angular width between either 0-360 or 0-180 degrees. In one embodiment, for the HOF descriptor of STIP features, $n_h=5$, where 4 bins are 4 different motion directions (up, down, left, right) and 1 bin describes no motion. For each spatio-temporal cell, the histogram bin values may be modified. First, the orientation-bin that needs to be modified is identified. This may be the orientation which is similar to the detected orientation of the camera view motion but with opposite direction. Then the value of the selected histogram bin is compensated with respect to camera view motion by subtracting a value which represents the amount of compensation to be applied. This amount may have been previously determined in the previous step. In a case, such that the result of the subtraction is negative, the interest point may actually be moving in the opposite direction with respect to the effect of camera view motion, thus the negative value may be transferred to the bin representing the opposite direction and changed to positive value. For example, if the original histogram bins are [0, 5, 0, 0], it means that a STIP point was detected and was moving in the direction represented by the second histogram-bin with a motion magnitude of 5. If the effect of camera view motion is in the same orientation and direction as this bin, it means that the descriptor includes also the camera view motion. If we assume that the effect of camera view motion in terms of motion magnitude (which represents the amount to be compensated) is 7, the difference in motion is 5−7=−2. Since the difference is negative, it means that the point was actually moving in the opposite direction (which, for example, is represented by the fourth bin). Thus, we set the value of the second bin to zero and the value of the fourth bin to 2 (because 5−7=−2 and then −2 will be changed to positive, i.e. 2). The resulting descriptor is thus compensated with respect to the camera view motion and describes only the original motion of the interest point.

As shown in block 618 of FIG. 6, the apparatus 20 may also be configured to provide the motion compensated descriptors of the temporal features. Thus, the apparatus may include means, such as the processor 22 or the like, for providing the motion compensated descriptors of the temporal features.

FIG. 7 shows a flow chart illustrating operations performed, such as by the apparatus 20, in accordance with an example embodiment of the present invention. Specifically, FIG. 7 shows an example embodiment of the method described in FIG. 6 which shows specific example input data related to the implementation of the described method using Space-Time Interest Points.

As shown in block 702 of FIG. 7, the apparatus 20 may also be configured to perform motion compensation for camera orientation. Thus, the apparatus may include means, such as the processor 22 or the like, for causing the performance of motion compensation for camera orientation. As shown in FIG. 7, block 702 may use, as inputs, camera orientation data from an auxiliary sensor and HOG/HOF descriptors.

As shown in block 704 of FIG. 7, the apparatus 20 may also be configured to select direction bins of HOG/HOF. Thus, the apparatus may include means, such as the processor 22 or the like, for causing the selection of direction bins of HOG/HOF. As seen, block 704 may use camera view motion direction from auxiliary sensors.

As shown in block 706 of FIG. 7, the apparatus 20 may also be configured to determine a compensation amount. Thus, the apparatus may include means, such as the processor 22 or the like, for causing the determination of a compensation amount. As shown in FIG. 7, block 706 may use focal length from a camera sensor and a distance of STIP points from a distance sensor to determine the compensation amount.

As shown in block 708 of FIG. 7, the apparatus 20 may also be configured to perform camera view motion compensation. Thus, the apparatus may include means, such as the processor 22 or the like, for performing camera view motion compensation.

In one embodiment, camera view motion compensation is performed, as shown in FIG. 7, utilizing inputs from selection of the direction of the HOG/HOF bins, the orientation compensation of the HOG/HOF descriptors and the determination of the compensation amount.

FIG. 8 shows a flow chart illustrating operations performed, such as by the apparatus 20, in accordance with an example embodiment of the present invention. Specifically, FIG. 8 shows an example embodiment of one usage of the present invention.

As shown in block 802 of FIG. 8, the apparatus 20 may also be configured to perform sensor aided extraction of spatio-temporal features using input data comprised of visual data and auxiliary sensor data. Thus, the apparatus may include means, such as the processor 22 or the like, for performing sensor aided extraction of spatio-temporal features using input data comprised of visual data and auxiliary sensor data.

As shown in block 804 of FIG. 8, the apparatus 20 may also be configured to perform detection of salient events using the camera view motion compensated descriptors of temporal features of visual data. Thus, the apparatus may include means, such as the processor 22 or the like, for performing detection of salient events using the camera view motion compensated descriptors of temporal features of visual data.

In one embodiment, applications using salient events may include summarizing or editing of video data, search, interaction, and/or human action classification of video data.

As shown in block 806 of FIG. 8, the apparatus 20 may also be configured to perform classification of video data, for example according to the genre, i.e. sport genres such as soccer and volleyball. Thus, the apparatus may include means, such as the processor 22 or the like, for performing classification of video data. Classification of the compensated temporal features may be performed using a Bag-Of-Words (BOW) approach. For exemplary purposes only, applications that may involve the classification of video data include media organization search, or camera scene determination.

Additionally or as an alternative implementation, instead of considering the two processes described above as two separate methods, the two processes may be combined in cascade. The first process, as shown, for example in FIG. 4, may be applied on the input video and associated auxiliary sensor data. If, as a result of the analysis, the overall length of all stable video segments is not enough to extract a sufficient number of temporal features, the second method, as shown for example in FIG. 5, may then be applied on the original data stream. This can improve the computational efficiency of the proposed invention. Additionally or as an alternative implementation, only one of the two processes may be performed, i.e. either only extraction of temporal features from stable video segments, or only compensation of temporal features extracted from part of or the whole video data.

Even though one possible implementation of FIG. 5 focuses on STIP features, the invention is not limited to any specific temporal (or spatio-temporal) features and may be applied to any features which incorporate motion information of the objects present in the videos.

Similarly, the invention is not restricted to the HOG/HOF descriptors. Instead, it can be applied also to other descriptors used for encoding the motion information, such as the 3D-gradients descriptor (3D-HOG) which describes shape and motion information at the same time. In particular, for the 3D-HOG the motion information may be expressed by the gradient computed in the temporal dimension. Thus, compensation of the 3D-HOG descriptor with respect to the camera view motion may be done by compensating the gradient computed in the temporal dimension.

As an alternative implementation, temporal features may be extracted only from selected objects. For example temporal features may be extracted from the bounding boxes surrounding people, where the people may be previously detected either automatically (by using person detection and localization algorithms) or manually. This alternative approach may be used for further decreasing the computational complexity related to the extraction of temporal features, because less features would be extracted, or when the extracted features would be used for recognizing actions and/or other temporal events which are specific to the identified objects, such as for example, drinking for a human, or a departure/leaving for a car.

Alternatively or in addition, the quality of the auxiliary sensor data (whenever it is available) may be analyzed for dynamically adapting the extraction of temporal features. One possible quality measure for the compass data is the calibration level of the compass. If the compass calibration level for a certain video (or the average calibration level, in case there are multiple calibration levels measured during the recording of a video) is less than a predefined threshold, the corresponding output of the compass data may be considered to be not reliable (because of low quality). The present invention is not restricted to any specific quality measure. Instead, any suitable quality measure may be adopted, even cross-modal, i.e. a measure obtained by analyzing another type of data which is related to the type of data for which a quality measure refers to. One example of cross-modal quality measure may consist of analyzing the gyroscope data for obtaining a quality measure for the compass data.

Regarding FIG. 4, in an example embodiment, if, for a certain segment of video or for the whole video, the quality is low for all auxiliary sensors, the analysis of the auxiliary sensor data may not select any stable segments because the whole segment (or video) could potentially be affected by camera view motion. Alternatively, a less safe approach may consider the whole segment (or video) as stable. In another embodiment, when, for a certain segment of video or for the whole video, the quality is low only for some auxiliary sensors, the information provided by those low quality sensors may be ignored as it may not be reliable. This may be done by, for example, considering the segment as non-stable without even analyzing the information provided by the good quality sensors or by considering the segment as non-stable only if the analysis of good quality sensors provides the information that the segment is non-stable.

Regarding FIG. 5, in one embodiment, if, for a certain segment of the video or for the whole video, the quality for all auxiliary sensors is low, the descriptors of the corresponding temporal features may either be removed completely or may be kept without being compensated. If, for a certain segment of the video or for the whole video, the quality is low only for those auxiliary sensors detecting camera view motion in a certain direction (e.g. horizontal, or vertical), the descriptors may either be removed completely or may not be compensated in the direction for which auxiliary sensors are of low quality.

One embodiment may cover the method applied to stereoscopic or 3D video. Yet one more embodiment may cover the method as implemented fully on the capturing device, where a captured video is processed in (near)-real-time (or post-processed), and "compensated". Yet one more embodiment may cover the method as implemented in a client-server system or cloud-system, where the processing happens on a different device than the capturing device, and the result of the compensation is transmitted to the capturing device for further processing. Yet one more embodiment may cover a peer-to-peer network architecture. Yet one more embodiment may cover the usage of the compensation method to be used in real-time in a device comprising multiple cameras where each camera may have a certain degree of movement within the device, for assisting the compensation of one or more of the multiple camera positions in real-time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving video data captured from a camera device;
receiving sensor data captured from auxiliary sensors associated with the camera device;
causing association of the sensor data and the video data using time data, wherein each of one or more samples of sensor data is associated with a single video frame;
detecting camera view motion in the sensor data;
determining one or more stable segments of the sensor data in which the camera view motion is less than a predefined threshold;
wherein, in an instance in which an amount of video data in which the camera view motion is less than the predefined threshold meets a predetermined threshold, the method further comprises:
causing, utilizing a processor, segmentation of the sensor data into the one or more stable segments;
extracting one or more temporal features from the video data associated with the stable segments of the sensor data to determine real motion of objects independent of camera view motion; and
applying the extracted temporal features of objects to each video frame; and
wherein, in an instance in which the amount of video data in which the camera view motion is less than the predefined threshold fails to meet the predetermined threshold, the method further comprises:
modifying the one or more temporal features as a function of the sensor data received from the auxiliary sensors and independent of camera view motion.

2. The method according to claim 1 further comprising:
performing orientation compensation on the one or more temporal features.

3. The method according to claim 1, wherein sensor data describes both camera motion and zoom.

4. The method according to claim 1, further comprising determining a quality level of the sensor data from one or more auxiliary sensors and adapting the extraction of the one or more temporal features according to the detected quality levels.

5. The method according to claim 1, wherein the temporal features extracted from the video data are space-time interest points.

6. The method according to claim 1, wherein temporal features extracted from the video data are one or more dense trajectories.

7. The method according to claim 1 wherein, when less than a predetermined threshold of camera view-motion is detected, or when less than a predetermined threshold of video data associated with the stable segments is present, the method further comprising:
causing extraction of one or more temporal features from the video data;
performing orientation compensation on the one or more temporal features;
causing extraction of a direction and compensation amount from at least a portion of the sensor data; and
performing camera view motion compensation on the orientation compensated temporal features using the direction and compensation amount.

8. The method according claim 7, wherein the orientation compensation may comprise aligning one or more descriptors with respect to a global vertical direction.

9. The method according to claim 7, wherein camera view motion compensation comprises identifying a histogram bin describing an orientation to be modified according to the direction information and modifying the histogram bin according to the compensation amount.

10. An apparatus comprising at least one processor and at least one memory storing computer program code, wherein the at least one memory and stored computer program code are configured, with the at least one processor, to cause the apparatus to:
receive video data captured from a camera device;
receive sensor data captured from auxiliary sensors associated with the camera device;
cause association of the sensor data and the video data using time data, wherein each of one or more samples of sensor data is associated with a single video frame;
detect camera view motion in the sensor data;
determine one or more stable segments of the sensor data in which the camera view motion is less than a predefined threshold;
wherein, in an instance in which an amount of video data in which the camera view motion is less than the predefined threshold meets a predetermined threshold, the method further comprises:
causing, utilizing a processor, segmentation of the sensor data into the one or more stable segments; and
extracting one or more temporal features from the video data associated with the stable segments of the sensor data to determine real motion of objects independent of camera view motion; and
applying the extracted temporal features of objects to each video frame; and
wherein, in an instance in which the amount of video data in which the camera view motion is less than the predefined threshold fails to meet the predetermined threshold, the method further comprises:
modifying the one or more temporal features as a function of the sensor data received from the auxiliary sensors and independent of camera view motion.

11. The apparatus according to claim 10, wherein the at least one memory and stored computer program code are further configured, with the at least one processor, to cause the apparatus to:
perform orientation compensation on the one or more temporal features.

12. The apparatus according to claim 10, wherein sensor data describes both camera motion and zoom.

13. The apparatus according to claim 10, wherein the at least one memory and stored computer program code are further configured, with the at least one processor, to cause the apparatus to determine a quality level of the sensor data from one or more auxiliary sensors and adapt the extraction of the one or more temporal features according to the detected quality levels.

14. The apparatus according to claim 10, wherein the temporal features extracted from the video data are space-time interest points.

15. The apparatus according to claim 10, wherein the temporal features extracted from the video data are one or more dense trajectories.

16. The apparatus according to claim 10,
wherein, when less than a predetermined threshold of camera view motion is detected, or when less than a predetermined threshold of video data associated with the stable segments is present, the at least one memory and stored computer program code are further configured, with the at least one processor, to cause the apparatus to cause extraction of one or more temporal features from the video data;
perform orientation compensation on the one or more temporal features;
cause extraction of a direction and compensation amount from at least a portion of the sensor data; and
perform camera view motion compensation on the compensated temporal features use the direction and compensation amount.

17. The apparatus according to claim 16, wherein the orientation compensation may comprise aligning one or more descriptors with respect to a global vertical direction.

18. The apparatus according to claim 16, wherein camera view motion compensation comprises identifying a histogram bin describing an orientation to be modified according to the direction information and modifying the histogram bin according to the compensation amount.

19. A computer program product comprising at least one non-transitory computer-readable storage medium having computer-readable program instructions stored therein, the computer-readable program instructions includes program instructions configured for:
receiving video data captured from a camera device;
receiving sensor data captured from auxiliary sensors associated with the camera device;
causing association of the sensor data and the video data using time data, wherein each of one or more samples of sensor data is associated with a single video frame;
detecting camera view motion in the sensor data;
causing, utilizing a processor, segmentation of the sensor data;
determining one or more stable segments of the sensor data in which the camera view motion is less than a predefined threshold;
wherein, in an instance in which an amount of video data in which the camera view motion is less than the predefined threshold meets a predetermined threshold, the method further comprises:
causing, utilizing a processor, segmentation of the sensor data into the one or more stable segments;
extracting one or more temporal features from the video data associated with the stable segments of the sensor data to determine real motion of objects independent of camera view motion; and
applying the extracted temporal features of objects to each video frame; and
wherein, in an instance in which the amount of video data in which the camera view motion is less than the predefined threshold fails to meet the predetermined threshold, the method further comprises:
modifying the one or more temporal features as a function of the sensor data received from the auxiliary sensors and independent of camera view motion.

20. A computer program product according to claim 19, wherein the computer-readable program instructions includes program instructions configured for:
when less than a predetermined threshold of camera view-motion is detected, or when less than a predetermined threshold of video data associated with the stable segments is present,
causing extraction of one or more temporal features from the video data;
performing orientation compensation on the one or more temporal features;
causing extraction of a direction and compensation amount from at least a portion of the sensor data; and
performing camera view motion compensation on the orientation compensated temporal features using the direction and compensation amount.

* * * * *